Jan. 11, 1966  C. H. WIKLUND  3,228,132
SLIDE PROJECTOR
Filed March 17, 1961  13 Sheets-Sheet 1
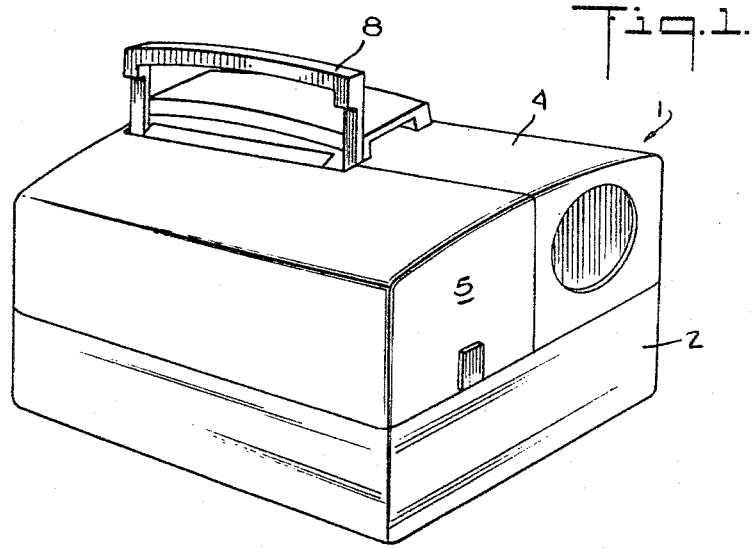
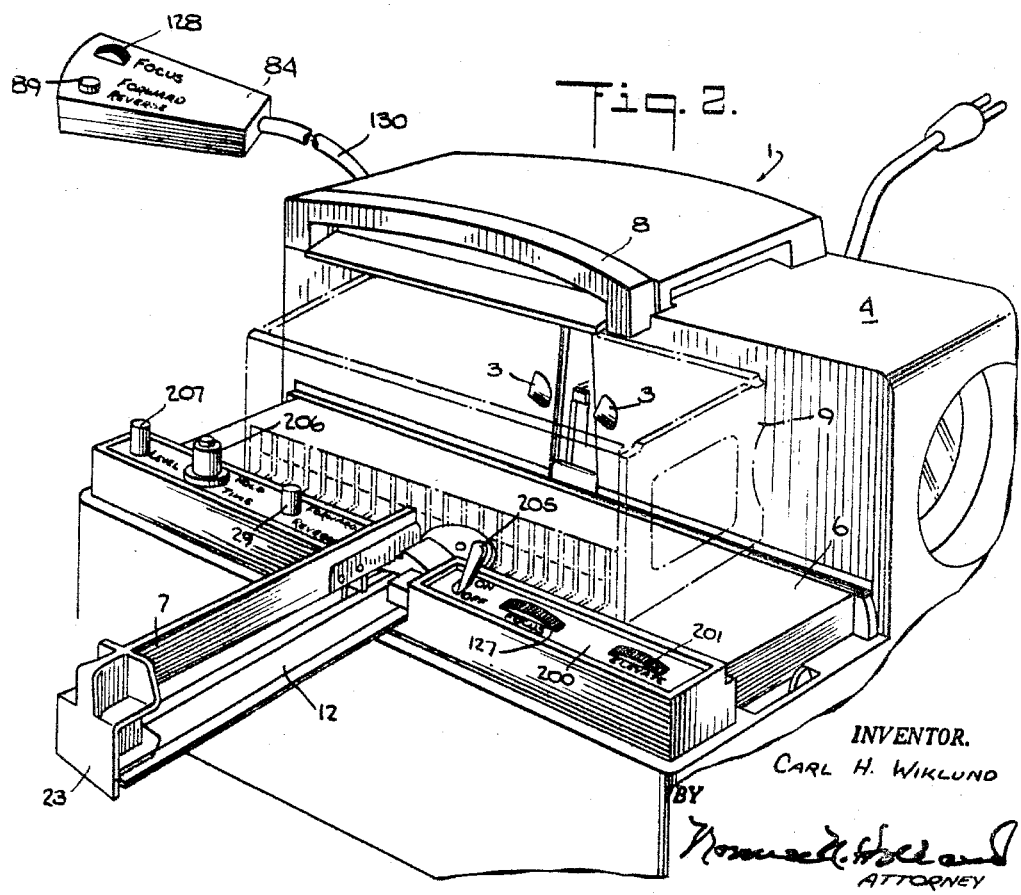
INVENTOR.
CARL H. WIKLUND
BY
ATTORNEY Jan. 11, 1966  C. H. WIKLUND  3,228,132
SLIDE PROJECTOR Filed March 17, 1961  13 Sheets-Sheet 2

INVENTOR.
CARL H. WIKLUND
BY
Norman R. Holland
ATTORNEY

Jan. 11, 1966  C. H. WIKLUND  3,228,132
SLIDE PROJECTOR
Filed March 17, 1961  13 Sheets-Sheet 4

INVENTOR.
CARL H. WIKLUND
BY
*Norman H. Holland*
ATTORNEY

Jan. 11, 1966  C. H. WIKLUND  3,228,132
SLIDE PROJECTOR

Filed March 17, 1961

INVENTOR.
CARL H. WIKLUND
BY
*Norman B. Holland*
ATTORNEY

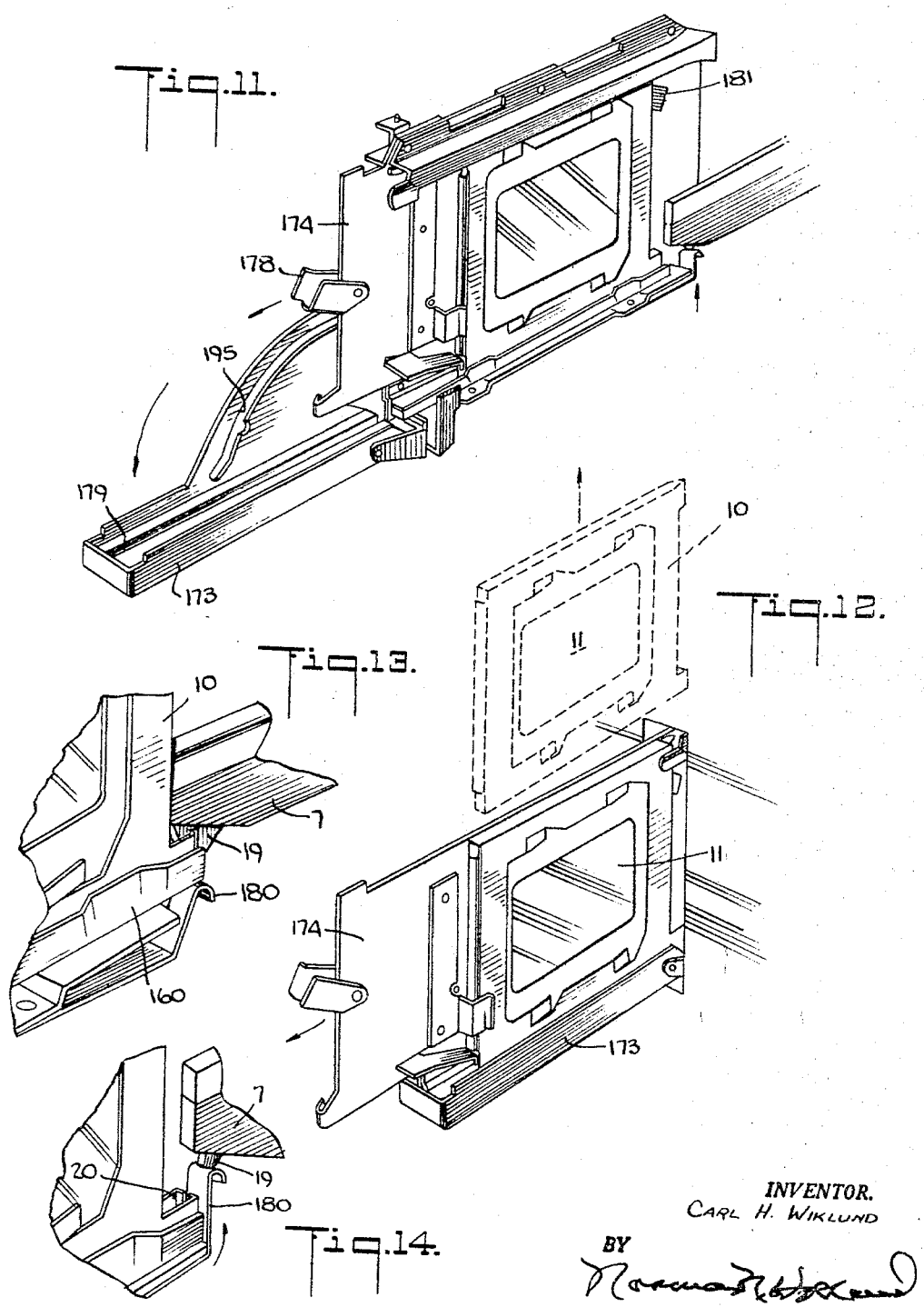

Jan. 11, 1966                C. H. WIKLUND                3,228,132
                              SLIDE PROJECTOR
Filed March 17, 1961                                 13 Sheets-Sheet 7
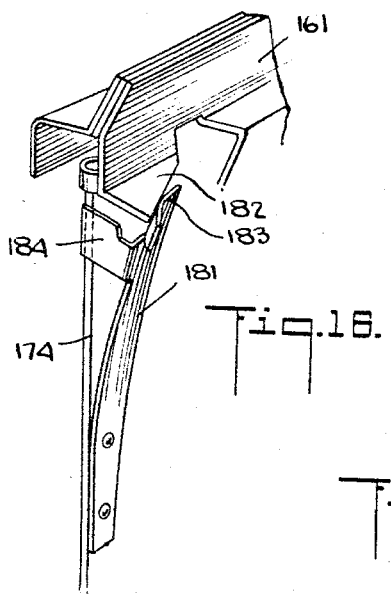
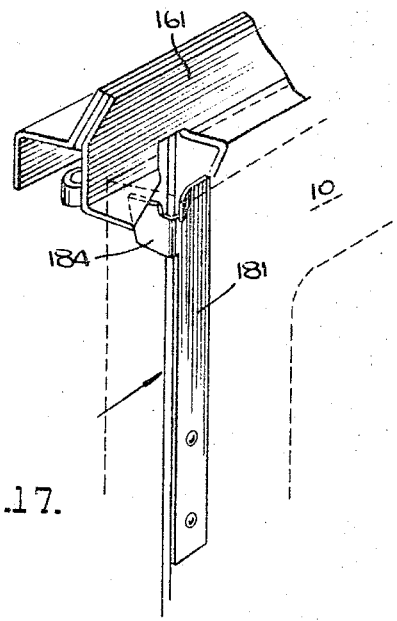
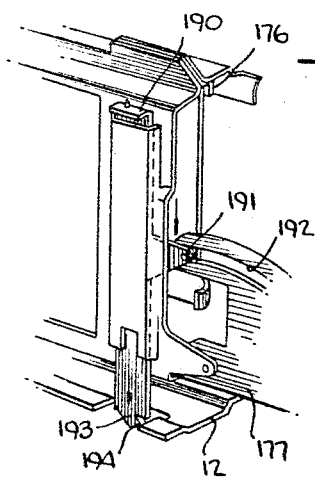
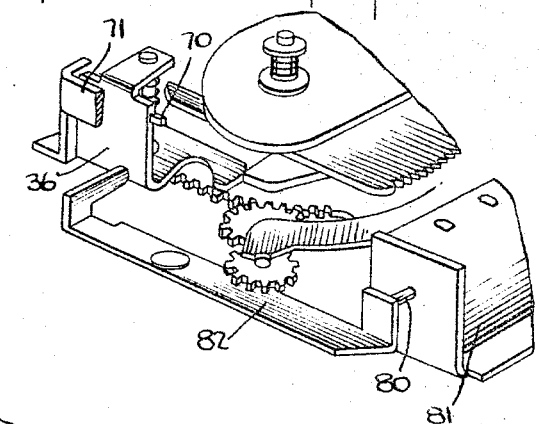
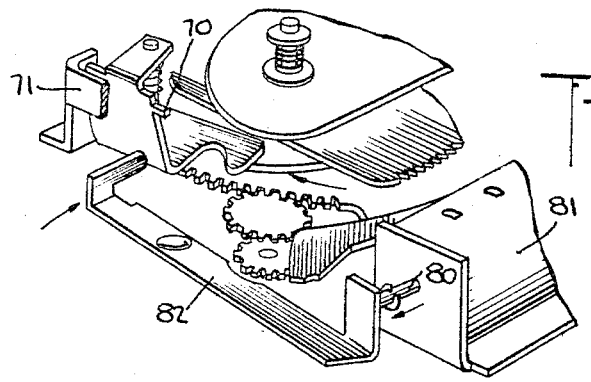
INVENTOR.
CARL H. WIKLUND
BY
Norman T. Holland
ATTORNEY

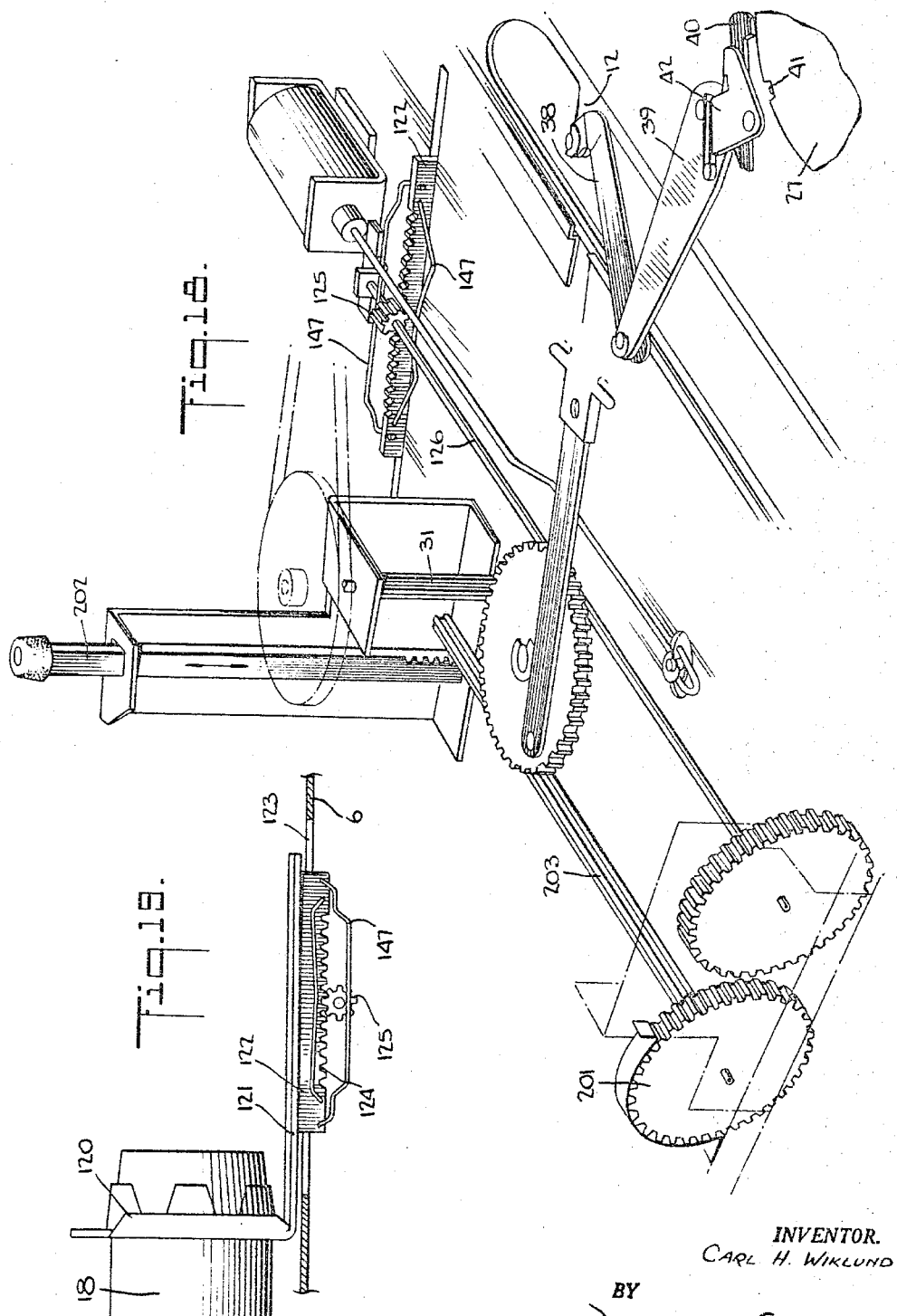

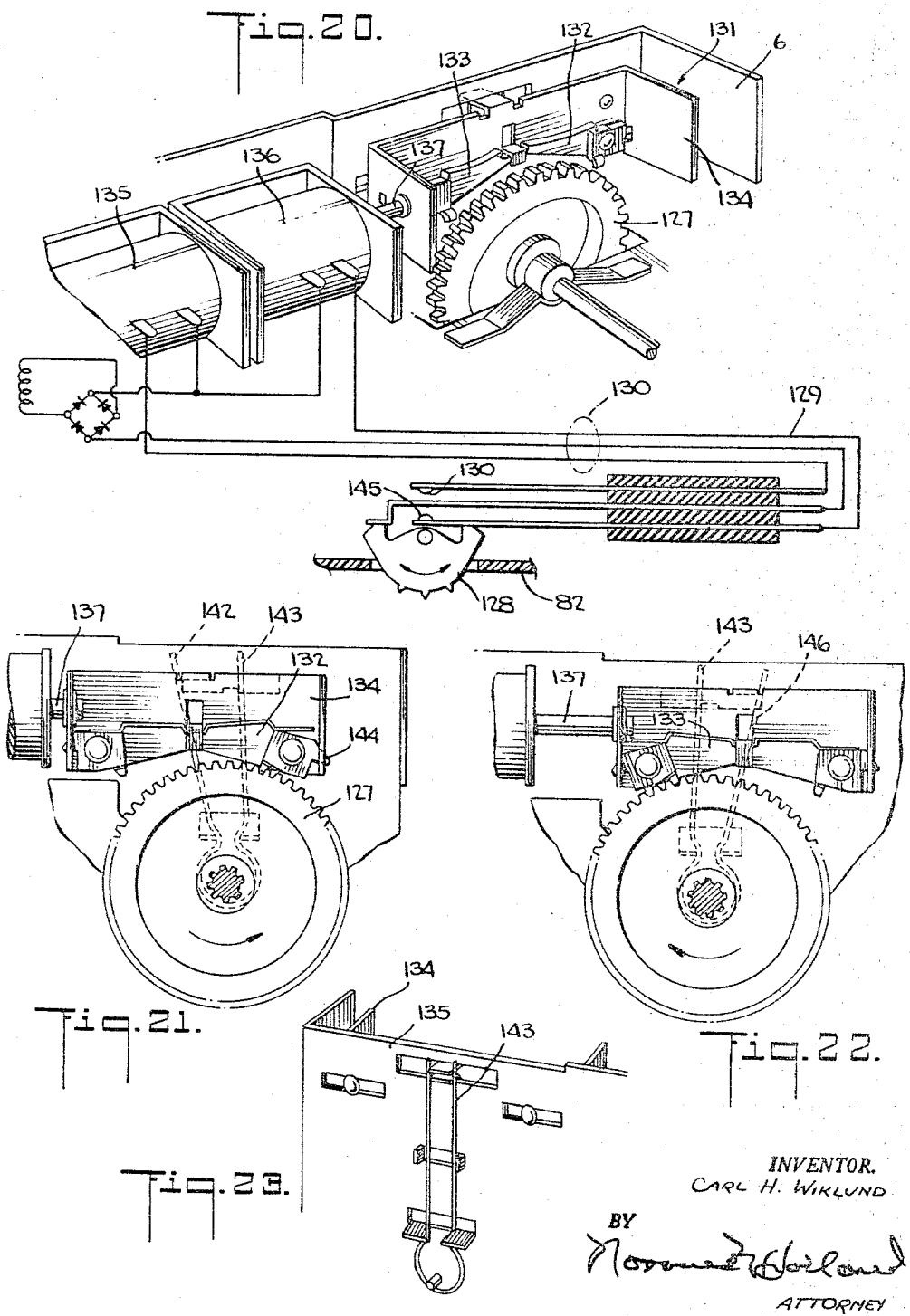

Jan. 11, 1966
C. H. WIKLUND
3,228,132
SLIDE PROJECTOR
Filed March 17, 1961
13 Sheets-Sheet 10
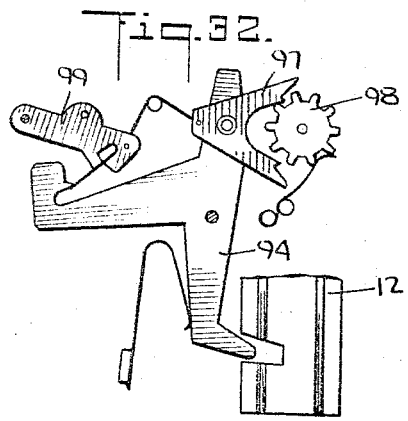
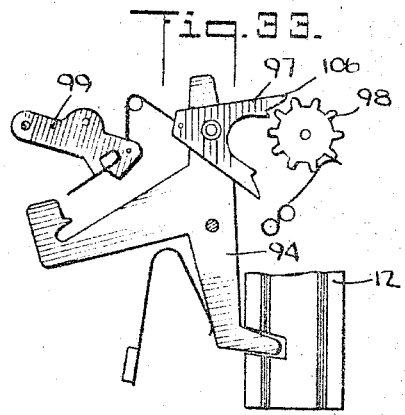
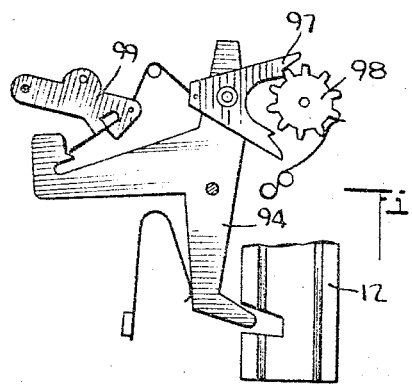
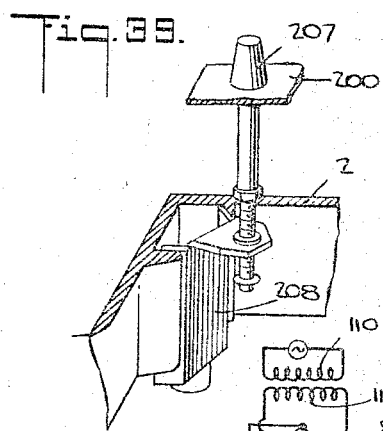
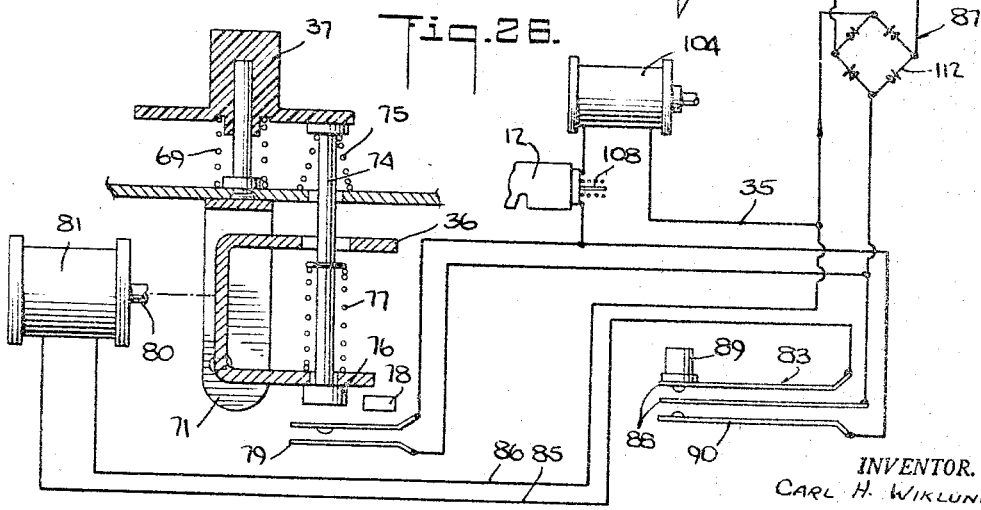
INVENTOR.
CARL H. WIKLUND
BY
ATTORNEY Jan. 11, 1966
C. H. WIKLUND
3,228,132
SLIDE PROJECTOR
Filed March 17, 1961
13 Sheets-Sheet 11
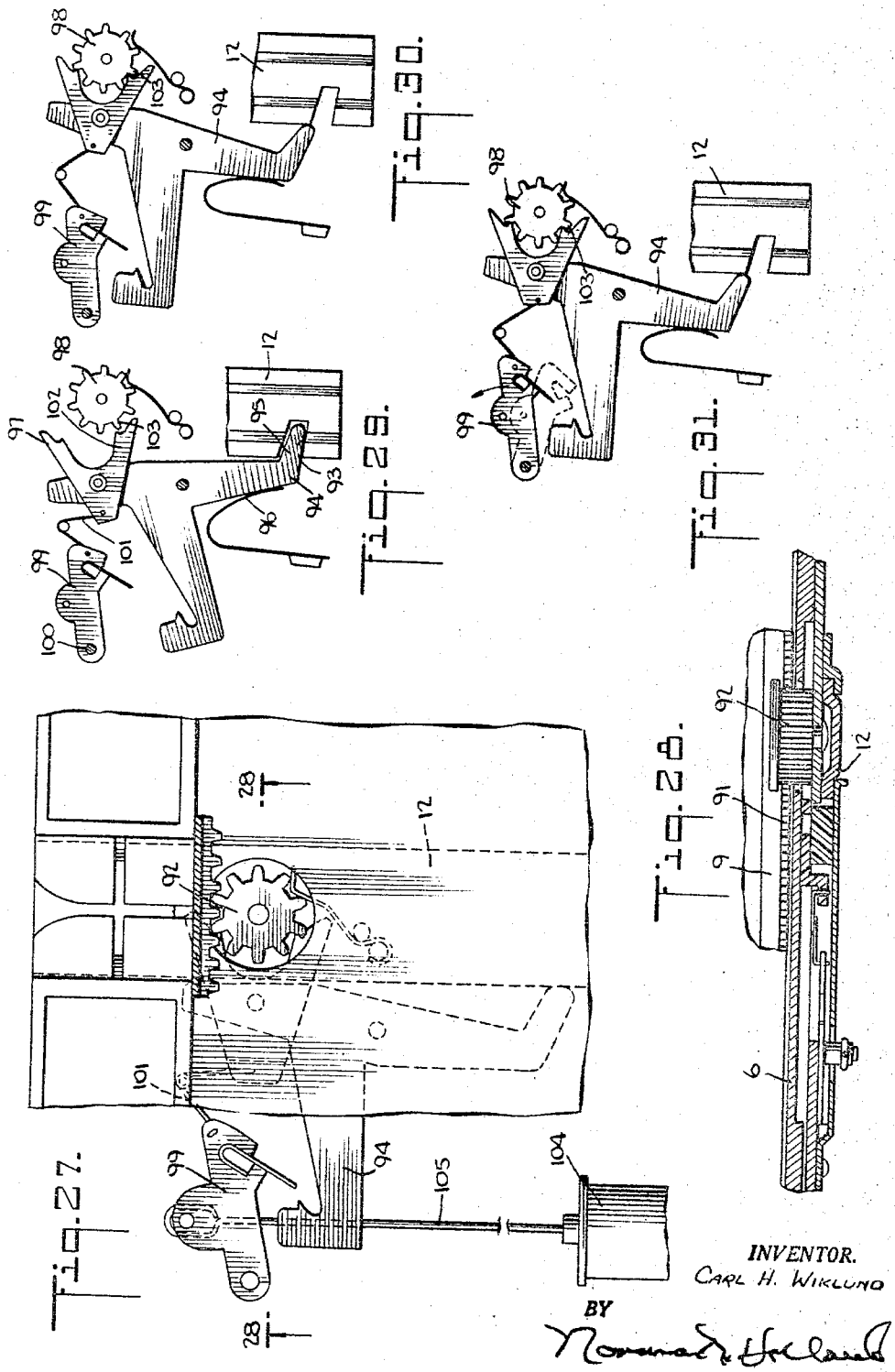
INVENTOR.
CARL H. WIKLUND
BY
ATTORNEY

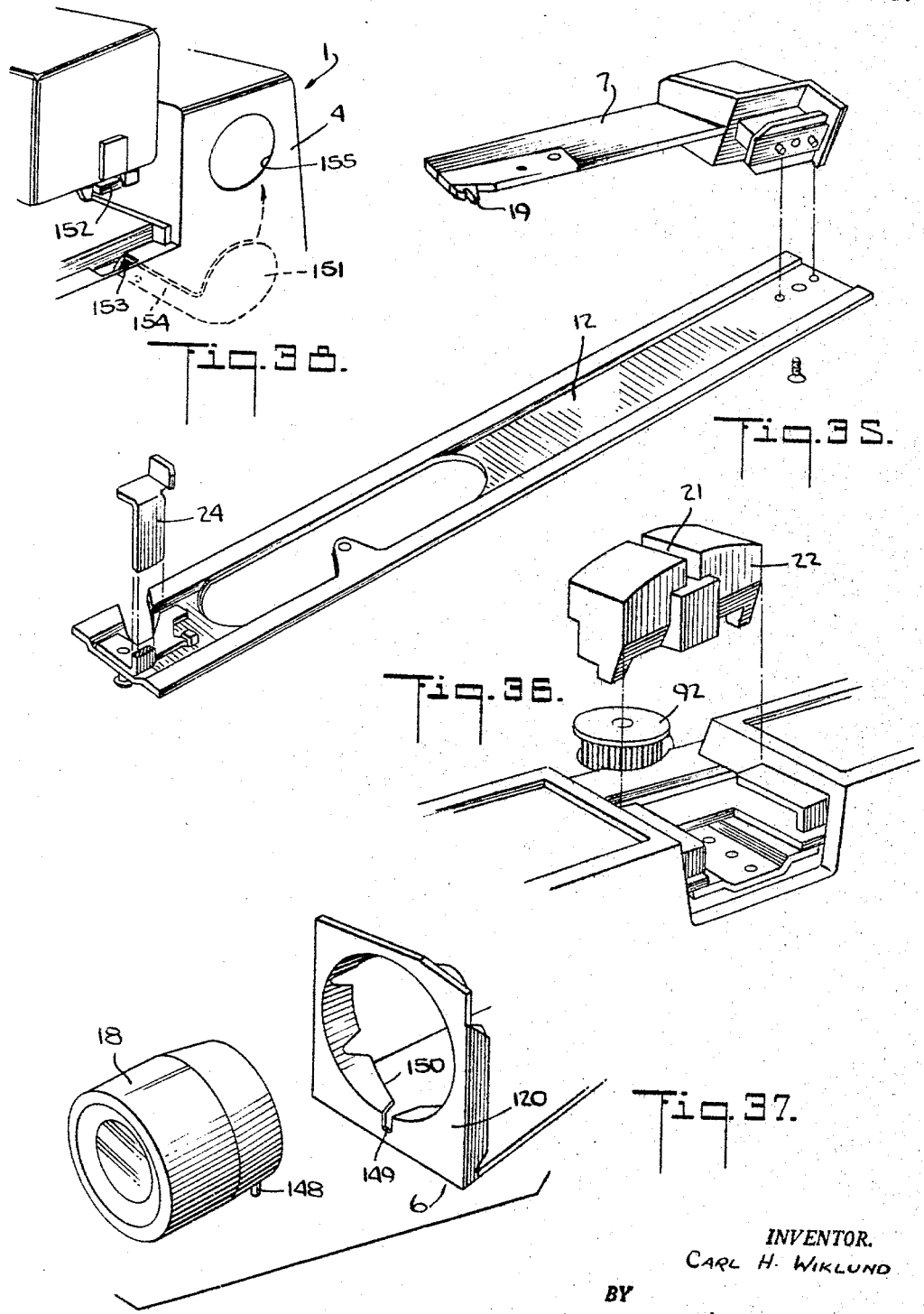

Jan. 11, 1966  C. H. WIKLUND  3,228,132
SLIDE PROJECTOR
Filed March 17, 1961
13 Sheets-Sheet 13
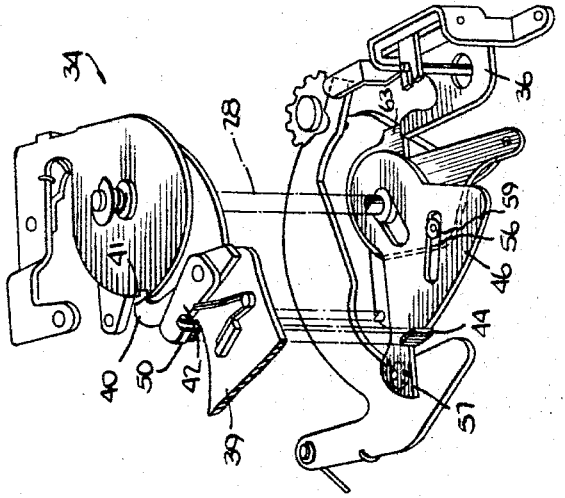
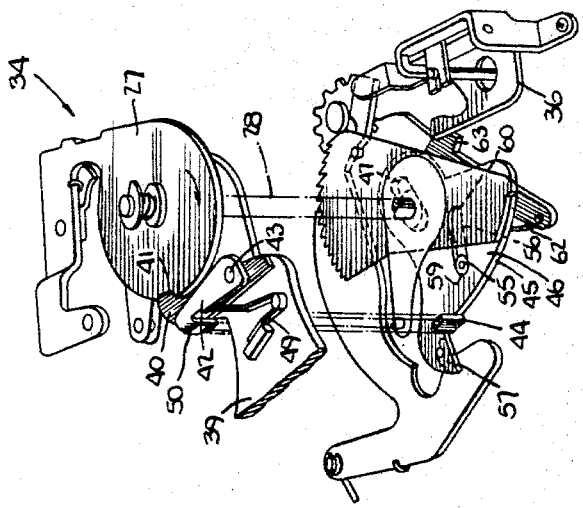
INVENTOR.
CARL H. WIKLUND
BY
ATTORNEY

United States Patent Office 3,228,132
Patented Jan. 11, 1966

3,228,132
SLIDE PROJECTOR
Carl H. Wiklund, New Rochelle, N.Y., assignor, by mesne assignments, to Airequipt Inc., New Rochelle, N.Y., a corporation of New York
Filed Mar. 17, 1961, Ser. No. 96,429
4 Claims. (Cl. 40—79)

The present invention relates to slide projectors and more particularly to an improved automatic magazine type slide projector with remote control of the slide changing and the projector focusing.

The present projector incorporates improved automatic slide changing with remote control in a simplified, novel, and compact arrangement which makes the benefits of both automatic and remote control available in a compact, light-weight and reliable slide projector. The projector of the present invention also provides for a variety of different optional operating methods from local hand operation to automatic remote operation with built-in interlocks and safety features which make such operations fool proof and simple and which project the slides and magazines. The projector also combines mechanical and electrical control systems to take advantage of the most desirable features of both systems for local or remote operation.

Accordingly, an object of the present invention is to provide an automatic slide projector adapted for remote control.

Another object of the present invention is to provide a compact automatic electro-mechanical slide projector.

Another object of the present invention is to provide an improved remotely controlled slide projector.

Another object of the present invention is to provide an improved automatic slide changer with remotely controlled slide changing and focusing.

Another object of the present invention is to provide an automatic magazine-type slide projector with forward and reverse magazine movement.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of the projector according to the present invention showing the covers in place;

FIG. 2 is a fragmentary perspective view of the projector in operating position;

FIGS. 11–14 are perspective views of the slide editor on the shutter housing;

FIG. 15 is a perspective view of the slide editor interlock for the slide injection lever;

FIGS. 16 and 17 are perspective views showing the operation of the slide editor slide-engaging latch;

FIG. 18 is a bottom perspective view of the projector chassis showing the focusing and projector elevating means;

FIG. 19 is a detailed side elevational view of the lens carriage mounting;

FIG. 20 is a perspective view of the remote focusing means;

FIGS. 21 and 22 are side elevational views of the remote focusing ratchet;

FIG. 23 is a perspective view illustrating the remote focusing pawl return spring;

FIGS. 24 and 25 are perspective views of the remotely operated slide changing solenoid and latch;

FIG. 26 is a diagrammatic view of the remote slide changing system;

FIG. 27 is a bottom plan view of the reversible magazine stepping means;

FIG. 28 is a sectional view along line 28—28 of FIG. 27;

FIGS. 29–34 are plan views of the magazine indexing means showing the operation of the reversible magazine stepping means;

FIG. 35 is an exploded perspective view of the sliding lever and the slide injector lever;

FIG. 36 is an exploded perspective view of the slide injection lever guide block and the magazine indexing gear;

FIG. 37 is an exploded perspective of the projector lens and lens mounting;

FIG. 38 is a fragmentary perspective view of the projector illustrating the automatic lens cover;

FIG. 39 is a perspective view of the projector leveling means; and

FIGS. 40 and 41 are perspective views of the coupling means in the slide changing mechanism.

General description

Figure 3:
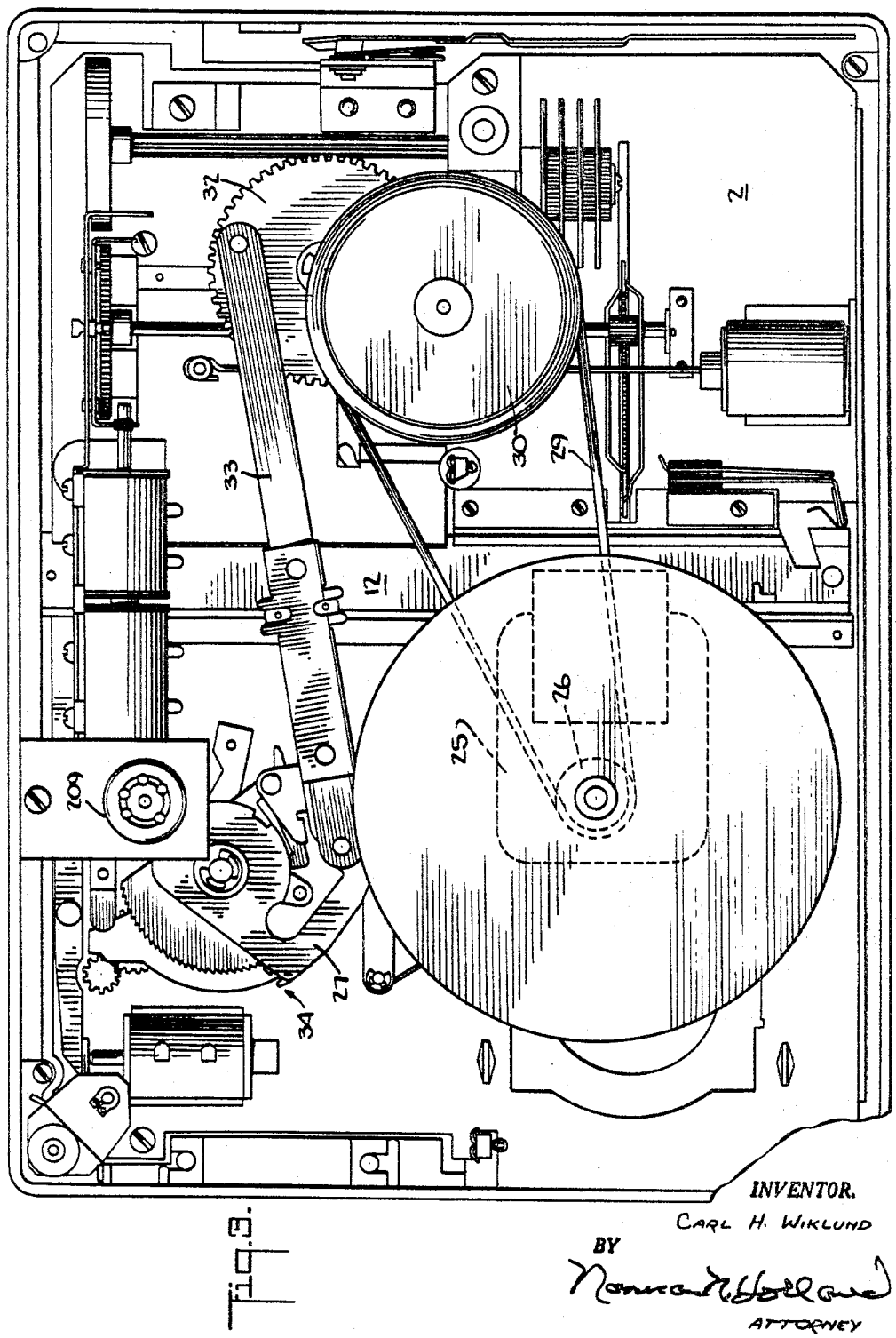
FIG. 3 is a bottom plan view of the projector with the bottom plate removed.

The projector will first be described generally with particular reference to FIGS. 1, 2, and 4.

The projector 1 has an integral housing and case construction comprising an enclosed base 2 with a permanent housing 4 covering the light source and optical system and a cover 5 removably mounted adjacent to housing 4 to enclose the slide magagine mounting plate 6 and the projector controls. A carrying handle 8 is slidably mounted on the housing 4 and is illustrated in FIG. 1 in its upward or carrying position and in FIG. 2 in its lowered position.

The projector 1 is adapted to successively show slides stored in a magazine 9. In the preferred embodiment, each magainze 9 is provided with a plurality of slide holding frames 10 and one slide 11 is inserted in each of the frames 10. A reciprocating slide injection lever 7 successively moves the frames 10 from the magazine 9 to the shutter housing 13 (FIG. 4) where each slide 11 is exposed to be projector optical system for projection onto a suitable screen.

The projector optical system, mounted on base 2, includes a lamp 14 and lenses 15 and reflector 16 positioned in a frame member 17. The beam of light from lamp 14 passes through lenses 15 and the slide 11 in shutter housing 13 for projection by lens system 18. The lens system 18 is adjustably mounted on base 2 for both direct and remote focusing as will be more fully described below.

The slide frames 10 are moved between the magazine 9 and the shutter housing 13 by the slide injection lever 7. A hook 19 (FIG. 35) in the inner end of the slide injection lever 7 engages a cooperating recess 20 in each frame 10 to control the movement of the frame 10 to and from the shutter housing 13. The slide injection lever 7 is attached by handle 23 to a sliding lever 12 slidably mounted on the base 2 and an upstanding pusher arm 24 is mounted on the end of the sliding lever 12 to insure the return of each frame 10 into the magazine 9. The hook 19 is yieldably mounted in the end of the slide injection lever 7 for vertical movement and a cam surface 21 (FIG. 36) on guide block 22 raises the hook 19 as the frame 10 is returned to the magazine to disengage hook 19 from recess 20. After the disengagement of hook 19 from the frame 10 the pusher arm 24 moves the frame further into the magazine. Cam surfaces 3 on the sidewalls of housing 4 completes the return of the frames by nudging the frames completely into magazine 9 as the magazine moves on plate 6.

A slide changing cycle starts with the slide injection lever 7 moved inwardly through the magazine 9 with a frame 10 positioned in projection position in the shutter housing 13 on the hook 19. A slide changing cycle consists of the return of the frame 10 to the magazine 9, the stepping forward of the magazine 9 to present the next successive frame 10 to the slide injection lever 7 and the engagement of this frame 10 by the slide injection lever 7 and its movement into the shutter housing 13 for projection. As will be described below the changing cycle may be controlled locally at the projector or from a remote position. If necessary the projector may also be focused from the same remote position. As will be also described below a separate convenient access means is provided for the slide in the shutter housing to simplify slide changing or editing.

*Slide changing*

The mechanism for moving the slide injection lever 7 through this cycle will first be described with particular reference to FIG. 3. A drive motor 25 having a drive pulley 26 is mounted on the base 2. The drive motor 25 runs continuously when the projector is plugged in for use to provide for a continuous rocking movement of an operating disc 27 on shaft 28 through the intermediation of pulley 26, belt 29, pulley 30, pulley pinion 31 (FIG. 18), drive gear 32 and connecting rod 33. The operating disc 27 is removably coupled to the sliding lever 12 and the slide injection lever 7 which move as a unit by the coupling means illustrated generally at 34 which is similar to the coupling means described fully in my Patent No. 2,915,840. This coupling means will be described herein in a sufficient degree to facilitate the description of the remote control means for changing the slides from a remote operating position.

The coupling means 34 is operated by either remote or local controls to change the slides. As described above, the operating disc 27 is continuously rocked or oscillated on the shaft 28 by its connection to drive motor 25. The coupling means 34 provides a detachable connection between the oscillating operating disc 27 and the sliding lever 12 which reciprocates the slide injection lever 7 to change the slides 11.

The coupling means 34 illustrated in FIGS. 40 and 41, comprises an engagement hook 40 pivotally attached at 43 to an engagement lever 39 and positioned to engage a slot 41 on the operating disc 27 under the control of an engagement cam follower 42 which is pivotally mounted on the engagement lever 39 on the same pivot 43 as engagement hook 40. The engagement cam follower 42 is controlled by a downwardly extending arm 44 on cam follower 42 which rides on a cam surface 45 on an engagement cam 46. The engagement cam 46 is mounted by means of a slot 47 on the shaft 28, and it is adapted to be rotated between two positions on the shaft 28 by an engagement cam release 48 which is also mounted on shaft 28.

In the first or engaged position of engagement cam 46, as seen in FIG. 40, the cam surface 45 and cam follower arm 44 have been moved inwardly toward shaft 28 by a spring 49 so that the engagement hook 40 engages the slot 41 in the operating disc 27. In its second or disengaged position, as seen in FIG. 41, the cam surface 45 is moved outwardly from shaft 28 so that the engagement cam follower 42 is swung outwardly, allowing a spring 50 to move the engagement hook 40 from the slot 41.

When the engagement cam 46 is in its engaged position as seen in FIG. 40, with the engagement hook 40 seated in the slot 41, the operating disc 27 and the engagement lever 39 move in synchronism and the rocking motion of the engagement lever 39 is translated into a reciprocating movement of sliding lever 12 through link 38 (FIG. 18). This moves the slide injection lever 7 through a slide changing cycle thereby moving one slide 11 out of the viewing position and another one into the viewing position for one rotation of the drive gear 32. When the engagement cam 46 is in its disengaged position, as seen in FIG. 41, the slide transfer lever is disconnected and stationary with a slide 11 in the viewing position in shutter housing 13.

The engagement cam 46 is moved between its engaged and its disengaged positions by the engagement cam release 48, which is controlled by the operator through manually operated control button 37 or a remote control as will now be described.

The engagement cam release 48 is rotatably mounted on the shaft 28 immediately adjacent to the engagement cam 46 with a cam roller 55 on the engagement cam release 48 engaging a cam slot 56 in the engagement cam 46. The engagement cam release 48 and the engagement cam 46 as well as the other rotatable members on shaft 28 are separated for independent movement by suitable washers. With the hooked end portion 57 of the engagement cam 46 preventing rotational movement of the engagement cam 46 about shaft 28 by its striking arm 44, the counter-clockwise rotation of an arm 58 of engagement cam release 48 from the engaged position as seen in FIG. 40 to the disengaged position as seen in FIG. 41 moves roller 55 from the radially outward end 159 of slot 56 to the radially inward end 60, causing the engagement cam 46 to move in slot 47 on shaft 28 so that cam surface 45 of the engagement cam 46 moves outwardly from shaft 28, thereby lifting the engagement cam follower 42 and removing the engagement hook 40 from slot 41.

The engagement cam release 48 is urged towards its engaged position, as seen in FIG. 40, by a spring 62 connected to the outer end of arm 58 on the engagement cam release 48. When the engagement cam release 48 is in this position, the engagement hook 40 engages the slot 41 in operating disc 27, causing the engagement lever 39 to rock with the operating disc 27. As the engagement lever 39 moves in a counter-clockwise direction arm 44 on the engagement cam follower 42 strikes the arm 58 of the engagement cam release 48 and moves the engagement cam release 48 to its disengaged position, as seen in FIG. 41. When the engagement cam release 48 reaches this position, the release lock 36 engages the extension 63 on the engagement cam release 48 and holds it in its disengaged position. As the engagement lever 39 continues on its cycle and is carried in a clockwise direction by the operating disc 27 back to the starting position the engagement cam 46 lifts the engagement cam follower 42, releasing the engagement hook 40 from the slot 41. The operating disc 27 will now oscillate independently of the engagement lever 39 so that the slide 11 which has been moved into the shutter housing 13 by the clockwise motion of the engagement lever 39 will remain in its viewing position until the release lock 36 is operated, as will be explained below, to free the engagement cam release 48 to initiate another cycle.

The release lock 36 has a U shaped cross section (FIGS. 24 and 26) and it is pivotally mounted by pinions 70 which are swingably mounted in release lock bracket 71. A release lock control button 37 (FIG. 26) controls the position of the release lock 36 through the intermediation of release lock shaft 74.

The release lock shaft 74 normally holds the release lock 36 in its engaged position with the engagement cam release 48 under the force of springs 69 and 75 which hold shaft 74 and button 37 in their upward positions.

Shaft 74 is moved downwardly by button 37 to swing the release lock 36 clear of the engagement cam release 48 to change a slide. The release lock 36 is connected to the shaft 74 by being engaged between flange 76 and spring 77. When the release lock 36 reaches its slide changing position against stop 78, further depression of the button 37 and the shaft 74 causes a compression of the spring 77 and a closing of a reversing switch 79. Reversing switch 79 operates a magazine reversing means as will be more fully explained below. Thus, depression of the button 37 about half-way down against springs 69 and 75 initiates a regular slide changing action to change slides so that the next successive slide in the magazine is projected. Further depression of button 37 against the added force of spring 77 closes reversing switch 79 to change slides by reprojecting the preceding slide in the magazine.

A slide changing control is also provided for remote operation by the system illustrated in FIG. 26. The armature 80 of a solenoid 81 is mechanically coupled to the release lock 36 by a lever 82 (FIG. 24). The solenoid 81 is coupled to a remotely located control switch 83 mounted in a remote control handle 84 (FIG. 2). The switch 83 is coupled to the solenoid 81 by wires 85 and 86 through a voltage source 87. The switch 83 has a first set of contacts 88 which are closed by the initial downward movement of control button 89 to energize the solenoid 81 to open release lock 36. An additional contact 90 is provided and is mounted in parallel with the above described reversing switch 79 to provide for reverse movement of the magazine 9 in the slide changing action.

A regular forward slide changing cycle is thus initiated by applying an initial downward pressure on either control button 37 or on the button 89 in remote handle 84. Additional downward pressure on either button closes the reversing switch at either location to provide a reverse change. The operator is able to distinguish between the forward and reverse action since a relatively light pressure on button 37 compresses springs 69 and 75 for a forward change and an additional noticeably heavier pressure is required to compress reverse spring 77. Similarly, button 89 on remote handle 84 is easily pushed down for a forward change by bending the single spring leaf to close contacts 88 while a noticeably greater pressure is required to close contact 90 by bending an additional leaf spring.

In the preferred embodiment of the projector, an adjustable timer is included in the coupling means 34 which activates the release lock 36 at adjustably controlled time intervals to provide for completely automatic slide changing. A preferred form of such a timer is disclosed in my Patent Number 2,915,840.

*Magazine indexing*

The slide magazines are slideably mounted on the projector by being placed on the magazine mounting plate 6 between a pair of spaced side rails. Each magazine has a rack 91 (FIG. 27) extending along one lower edge which engages a magazine indexing gear 92.

The magazine indexing gear 92 advances one tooth for each slide changing cycle to advance the magazine 9 so that the next successive slide frame 10 is presented to the slide injection lever 7. This indexing control for the magazine indexing gear 92 is operated by the above described slide changing mechanism as illustrated in detail in FIGS. 27–34.

Each slide changing cycle includes a reciprocating movement of the sliding lever 12 from a fully inserted position with its inner end adjacent to the shutter housing through a fully extended position with its inner end beneath the slide magazine and a subsequent return to the fully inserted position. The magazine indexing gear is controlled by an indexing notch 93 in the end of the sliding lever 12 as illustrated in FIGS. 29–34 which co-operates with a ratchet and pawl mechanism which will now be described in detail.

FIGS. 29 and 30 illustrate the operation of the ratchet and pawl for a forward step of the magazine. This indexing means includes a pivotally mounted pawl control lever 94 mounted on the base adjacent to the sliding lever 12 and having a projection 95 adapted to intermittently engage the indexing notch 93 in the sliding lever 12. When the sliding lever 12 reaches its fully extended position as illustrated in FIG. 29 the projection enters the indexing slot 93 in the sliding lever 12 under the force of spring 96. This rocks the pawl 97 away from ratchet wheel 98. In the normal operation for forward movement of the magazine 9 a pawl reversing lever 99 pivotally mounted on base 6 at 100 is kept in its upper position (FIG. 29) so that connecting spring 101 holds the lower tooth 102 on ratchet 97 adjacent ratchet wheel 98. Now when the sliding lever 12 begins its return motion to move the next slide frame 10 into viewing position, its return movement lifts projection 95 from notch 93 in sliding lever 12. This rotates control lever 94 in a clockwise direction (FIGS. 30 and 31) and moves the tooth 102 against a tooth 103 on the ratchet wheel. This turns ratchet wheel 98 and interconnected indexing gear 92 in a counterclockwise direction to advance the magazine 9 to present the next slide frame 10 to advancing injection lever 7.

The reverse operation of the indexing mechanism is illustrated in FIGS. 26 and 27 and 31–34.

The reverse movement of the indexing mechanism to return the magazine so that the previously shown slide is projected instead of the next successive slide is controlled by reversing lever 99. Lever 99 is drawn downwardly by solenoid 104 and connecting arm 105 (FIGS. 27 and 31) for the reverse operation. The indexing action with the reversing lever 99 in its reverse position is illustrated in FIGS. 32–34.

When the sliding lever 12 moves outwardly as illustrated in FIGS. 32 and 33 to the position where slide injection lever 7 is clear of the magazine 9 as illustrated in FIG. 2, projection 95 again moves into slot 93. With the reversing lever 99 in this position the upper tooth 106 of pawl 97 is moved adjacent to the ratchet wheel 98. Now as the sliding lever 12 returns towards the shutter housing to insert another slide frame 10 therein, pawl control lever 94 again rotates in a clockwise direction (FIG. 30) so that tooth 106 on pawl 97 engages ratchet wheel 98 to turn it and interconnected indexing gear 92 so as to reverse the magazine 9 on base 6. At the completion of its counterclockwise movement, projection 107 on pawl control lever 94 strikes the reversing lever 99 (FIG. 31) to swing it upward to its normal forward indexing position as described above so that solenoid 104 must be energized each time that a reverse indexing is desired.

The reverse indexing is controlled by the above described control button 37 or optionally by the remote control button 89 on remote control handle 84. As described above, either of these buttons when depressed an initial amount, initiate a normal forward slide changing cycle. When further depressed, either button operates a reverse cycle by closing reverse switch 79 or 90 respectively (FIG. 26). The reverse switch 79 connects voltage source 87 to solenoid 104 through contact switch 108. Switch 108 is positioned adjacent the shutter housing 13 so that it is closed by sliding lever 12 when sliding lever 12 is in its fully inserted position and when a frame 10 is fully inserted in projection position. This permits the operation of the reversing means to initiate a reverse indexing but thereafter deactivates the solenoid 104 to permit the return of the indexing mechanism to normal forward operation as described above.

The reversing switch contact 90 in the remote control handle is connected in parallel with the local control reversing switch 79 to provide similar reversing action at the remote control handle 84.

A preferred embodiment of the solenoid control voltage source 87 is illustrated in FIG. 26. This source uses the regular winding 110 of the projector motor 25 as a transformer primary and employs a low voltage secondary winding 111 which is coupled to the solenoids 81 and 104 through a rectifier 112 to provide them with low voltage D.C. energizing current. This arrangement provides a convenient and compact source of low voltage so that only low harmless voltages are used on the remote control handle and in the control wiring systems and so that the solenoid and switch contact lives are extended.

Focusing

The projector lens system 18 is mounted in front of the slide housing on a lens bracket 120 which is slideably mounted on the projector base 6. As illustrated in FIG. 19 the lens bracket 120 has a flat base portion 121 with a flange 122 adapted to slide in a bracket positioning slot 123 formed in the projector base 6. The lower edge of the flange 122 has suitable ratchet teeth 124 adapted to be engaged by a pinion 125 mounted at one end of a horizontal focusing shaft 126 as illustrated in FIG. 18. A focusing wheel 127 is mounted on the opposite end of the shaft with its upper portion protruding through the projector base 6 as illustrated in FIG. 2. Rotation of the focusing wheel 127 in the appropriate direction thus moves the lens bracket 120 and the lens system 18 mounted therein toward or away from the slide 11 as desired to focus the projected picture.

As illustrated in FIGS. 20–23 the focusing wheel 127 is also used in a remote focusing system which permits the focusing operation to be performed from a remote position by a focusing button 128 provided on a remote control handle 84 positioned at the end of the remote control cord. The remote control handle 84 is illustrated in FIG. 2 with the focusing control button 128 and with connecting wires 129 whose function is schematically illustrated in FIG. 20. Wires 129 are included in a suitable remote control cord 130 with the wiring for the above described control button 89 of the slide changing system.

The remote focusing control comprises a ratchet system 131 with two pawls 132 and 133 mounted at the opposite ends of a pawl frame 134. The pawl frame 134 is slideably mounted adjacent the bottom of the focusing wheel 127 on a suitable bracket 135 and is adaptable for sliding movement to bring one or the other of the pawls 132 or 133 into contact with a tooth on the focusing wheel 127. Two solenoids 135 and 136 are provided with a common armature 137 connected to the pawl frame 134. The solenoids 135 and 136 are arranged so that each moves the armature in an opposite direction from the other. As illustrated in FIG. 20, the remote control focusing button 128 mounted in the remote control handle 82 is rotated in a clockwise direction to close the upper contact 139 of a switch 140 to thereby connect the first solenoid 135 to the voltage source 87 through lines 129 in the remote control cord 130. This causes the armature 137 to move to the left as illustrated in FIG. 21 bringing the right hand pawl 132 into engagement with a tooth 141 on the focusing wheel 127 whereby rotating the wheel 127 one step in a counterclockwise direction. When the focusing button is released the solenoid 135 is de-energized permitting the pawl 132 to return to its center position under the force of leaf 142 of the spring 143. As illustrated in FIG. 21, the pawl 132 is rotatably mounted on the pawl frame 134 to permit it to swing clear of the focusing wheel teeth against the force of a pawl spring on its return movement.

The stop 144 on the pawl 132 engages the pawl frame 134 to hold the pawl in proper position to engage the focusing wheel 127.

Rotating of the focusing button 128 in the opposite direction energizes the solenoid 136 by connecting it to voltage source 87 through contact 145 and wires 129. This moves the armature 137 to the right causing the focusing wheel 127 to be engaged by the opposite pawl 133 so that the focusing wheel 127 and the interconnected lens system 18 are moved one step in the opposite direction. The leaf 146 of spring 143 returns the armature 137 to its central position when the focusing button 128 is released.

Thus, it is seen that the lens system 18 is moved in either direction as necessary to sharply focus the projection image by rocking the focusing button in the proper direction the necessary number of times. The movement of the focusing button 128 in one direction or the other is seen to correspond in a general way to the related movement of the lens so that the operator obtains the feel of the focusing action even though he is performing the focusing operation at a remote position. The spring members 147 mounted on the opposite sides of the flange 122 on the bracket 120 slideably engage the projector base 6 to provide a firm yet slideable positioning of the bracket 120 on the base 6. The lens system 18 is removably mounted in frame 120 by cooperating mounting pin 148, slot 149 and cam surfaces 150 as illustrated in FIGS. 4 and 37. A protective cover 151 is provided for the lens system 18 which is automatically swung into position when projector cover 5 is put on. Lug 152 on cover 5 engages one end 153 of the cover mounting arm 154 to swing cover 151 across lens opening 155 in housing 4 (FIG. 38).

Shutter housing and slide editor

As described above, each of the frames 10 is moved from the magazine 9 by the slide injection lever 7 into a shutter housing 13 for viewing. When the frame 10 is in this position it rests loosely between a lower frame supporting channel 160 and an upper supporting channel 161 (FIG. 4). A rigid plate 162 fixedly attached to the base 2 supports the upper channel 161 and it has a suitable aperture 163 cut in its center to permit passage of the projector light beam towards the lens system 18. An opaque shutter 164 is pivotally mounted on pivot points 165 on the plate 162 so that the shutter plate 164 in its normal closed position is interposed between the aperture 163 in the plate 162 and the lens system 18 to cut off the transmission of the projector light beam through lens system 18.

Figure 4:
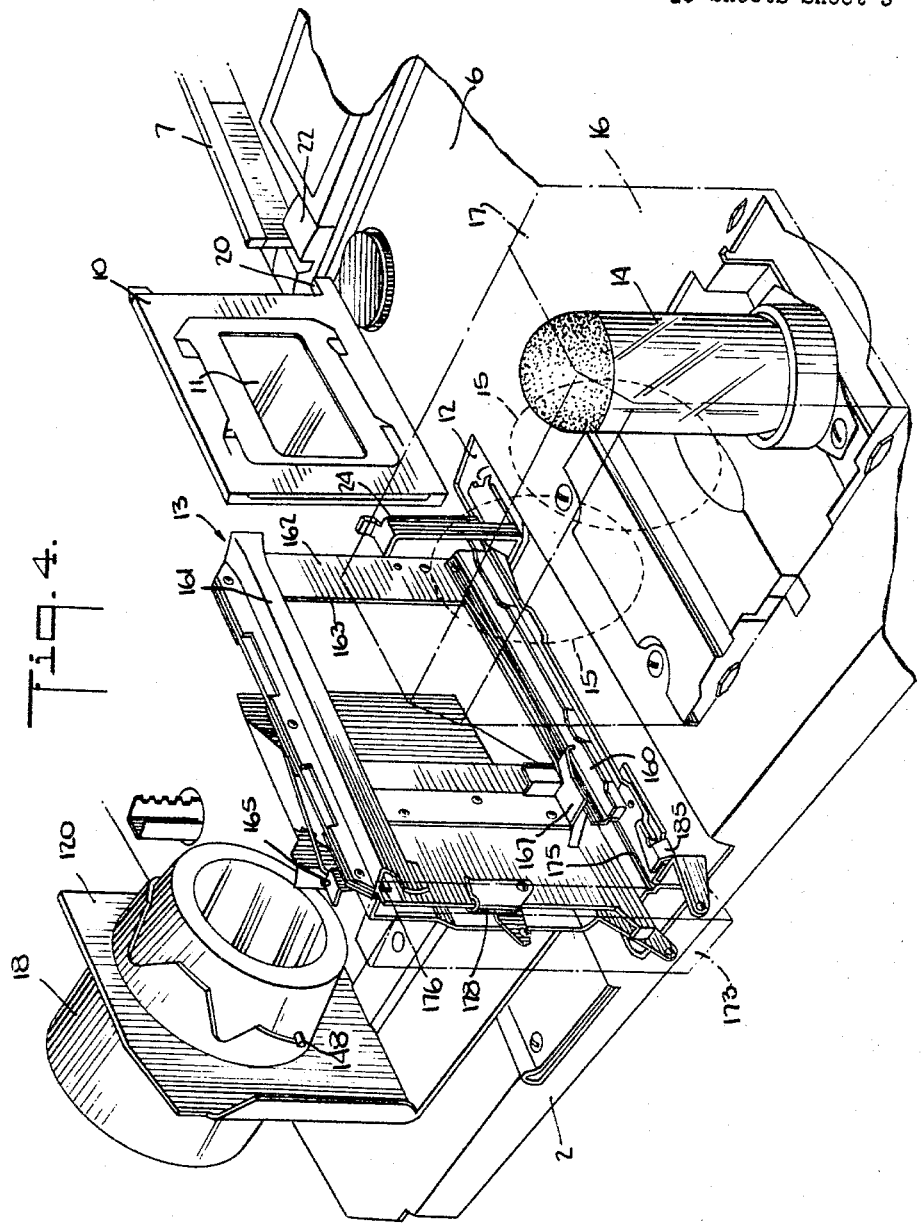
FIG. 4 is an enlarged perspective view of the shutter housing and the optical system.
Figure 6:
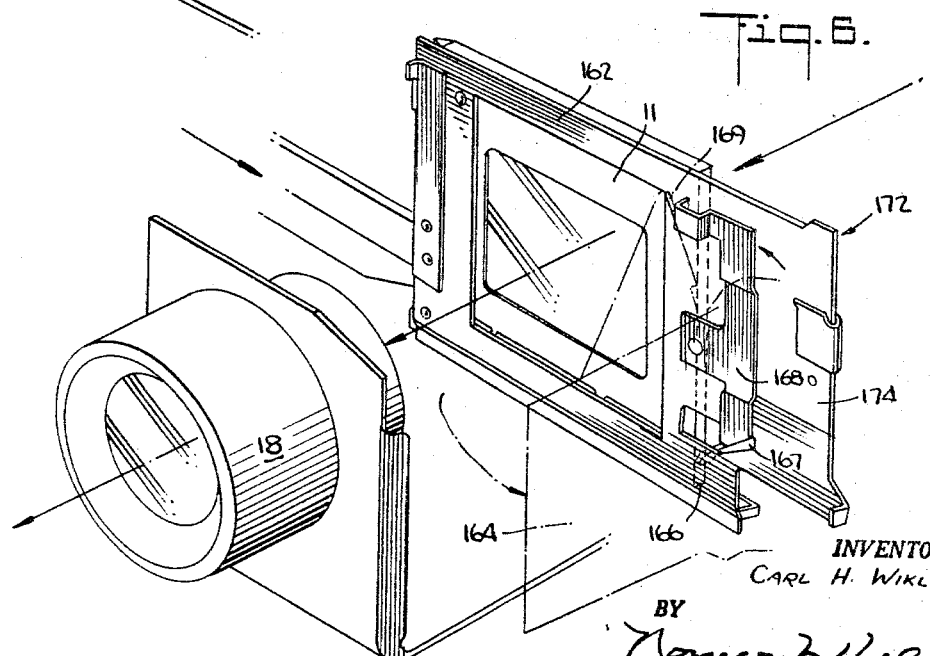

As each slide frame 10 is moved into the shutter housing 13 by the slide injection lever 7 the lower inner corner 166 of the frame 10 strikes the foot 167 of a pivotally mounted shutter opening arm 168 best illustrated in FIGS. 4 and 6. The movement of the lower corner 166 of the slide frame 10 against the foot 167 of the shutter arm 168 causes the upper edge of the arm 168 to be swung against a projecting portion 169 of the shutter mounting arm 170 so that the shutter 164 is rotated about its pivots and clear of the light beam to its open position as illustrated in FIG. 6 against the force of the shutter closing spring 171 which closes the shutter automatically each time that a frame 10 is withdrawn from the shutter housing 13.

In order to provide for the removal of a slide 11 from a frame 10 to permit replacement of the slide 11 during an editing of the magazine contents, a slide editor 172 (FIG. 6) is preferably provided on the shutter housing 13. This slide editor 172 permits editing of the magazine 9 while it is in place on the projector and also permits the editing to be done immediately after the viewing of a slide 11 by providing access to the shutter housing 13 through an auxiliary editing cover 173 mounted on the opposite side of the projector housing 4 from the slide injection lever 7. As will also be seen from the following description, the slide editor 172 may also be used to insert individual slides 11 into the projector 1 for viewing without using a magazine.

The slide editor 172 comprises a separate apertured editor plate 174 slideably mounted on the shutter housing 13 between a groove 175 in the lower portion of the shutter housing and a cooperating groove 176 formed in the upper frame supporting channel 161. Access is provided to the outer edge of the editor plate 174 by the pivotally mounted editor cover 173 which is swung downwardly from its normal closed position as illustrated in FIG. 4 to its open position as illustrated in FIG. 11 when it is desired to slide the editor plate 174 out of the housing 4 to expose a frame 10. A handle 178 is pivotally mounted on the outer edge of the editor plate 174 to facilitate its withdrawal outwardly from the shutter housing 13 in the direction of the arrow as illustrated in FIG. 11 in slot 179 in editor cover 173. In order to retain frame 10 on the slide editor plate 174 as the plate is drawn outwardly of the housing 4 the lower frame supporting channel 160 is attached to the editor plate 174 for removal therewith. The shutter arm 168 also is mounted on the editor plate 174 and it will be seen that the outward movement of the editor plate 174 draws the upper end of the arm 168 away from the shutter 164 permitting the shutter 164 to close under the force of the shutter spring 171 to cut off the projector light beam during the editing operation.

In order to release the slide frame 10 from the hook 19 of the slide injection lever 7 a release spring 180 is mounted on the bottom of the shutter housing 13. As illustrated in FIG. 13 the spring 180 is normally held downwardly away from the hook 19 by the lower surface of the frame supporting channel 160 on the slide editor plate 174. When the plate 174 is withdrawn from the slide housing 4 the interconnected channel 160 moves with the plate 174 thereby releasing the spring 180 and permitting it to move upwardly as illustrated in FIG. 14 to raise the hook 19 clear of the recess 20 in the slide frame 10. The slide frame 10 is held in place on the slide editor plate 174 during its removal by a slide gripping spring 181 mounted on the slide editor plate 174 as illustrated in FIGS. 11 and 17. When the slide editor plate 174 is in its normal inserted position for regular viewing the slide gripping spring 181 is held backwardly out of the path of the slide frames 10 to permit their normal passage into and out of the viewing position by a cam 182 formed at one side of the upper slide frame supporting channel 161 as illustrated in FIG. 16. When the slide editor plate 174 is withdrawn along the upper channel 161, the upper end 183 of the spring 181 slides off the cam 182 causing the flange 184 on the spring 181 to engage the edge of the slide frame 10 to draw it along with the moving slide editor plate 174.

In order to permit each slide frame 10 to be drawn out the opposite side of the projector from the magazine 9 by editor plate 174, it is necessary to swing the pusher arm 24 from its normal position in the path of the slide frame 10 to an outward position clear of the slide frames 10.

Figure 7:
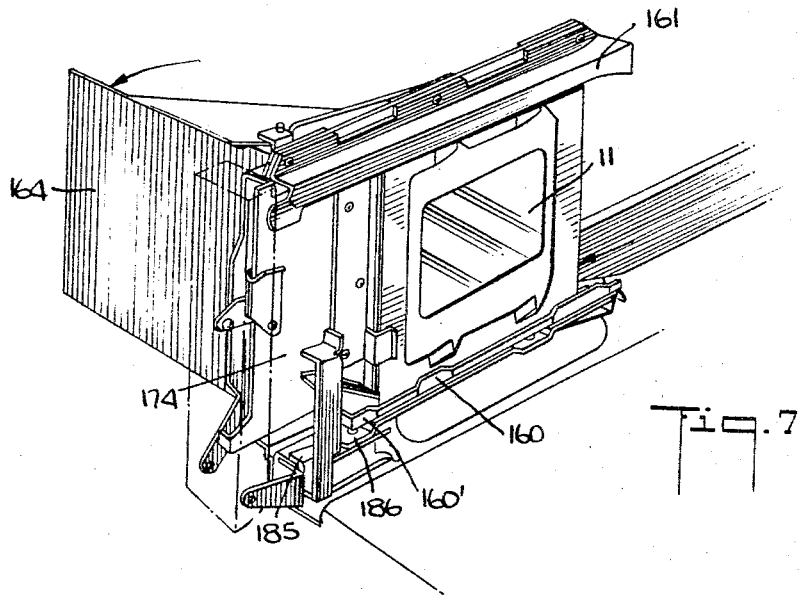
Figure 8:
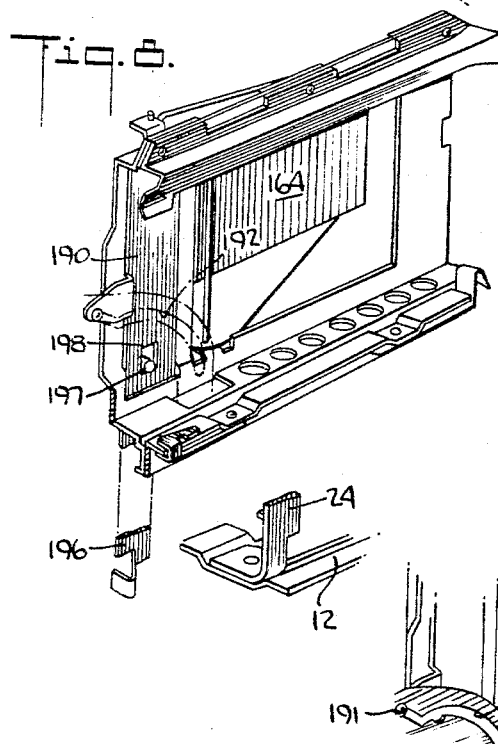

This is provided for by having the pusher arm 24 yieldably attached to the sliding arm 12 so that it may rock outwardly of the sliding arm 12 when the editor plate is drawn outwardly of the projector. The leading edge 160′ (FIG. 7) of the lower channel 160 engages a pivotally mounted cam 185 positioned for horizontal movement about a pivot 186 on the bottom of the shutter housing 13. This cam 185 swings outwardly against the pusher arm 24 thereby swinging the pusher arm 24 clear of the frame 10 as it moves past the pusher arm 24 on the editor plate 174.

It is desirable to prevent operation of the slide changing mechanism when the slide editor plate 174 is in its outward position since this would permit advancement of the magazine without the reinsertion of the slide frame 10 and also since the slide editor plate 174 in its outward position cannot receive the next slide frame 10 from the magazine 9. An interlock is therefore provided to prevent operation of the slide changing mechanism when the slide editor is being used. A preferred form of this interlock includes a generally vertical interlock bar 190 slideably mounted on the shutter housing 13 and having a pinion 191 adjacent the center portion (FIG. 15) coupled to the cam slot 192 in the editor cover 173. The cam slot 192 thus controls the vertical position of the interlock bar 190. The slot 192 is shaped so that the opening of the editor cover 173 drops the interlock bar 190 causing a hook 193 on its lower end to engage a slot 194 in the sliding arm 12 preventing its movement and thus preventing operation of the transfer means as long as the editor cover 173 is open. The inclined portion of the slot which drops the interlock bar at the very first downward movement of the editor cover is illustrated at 195 in FIG. 11. Thus, operation of the slide transfer means is prevented as soon as the first initial outward swing of the editor cover occurs.

Figure 5:
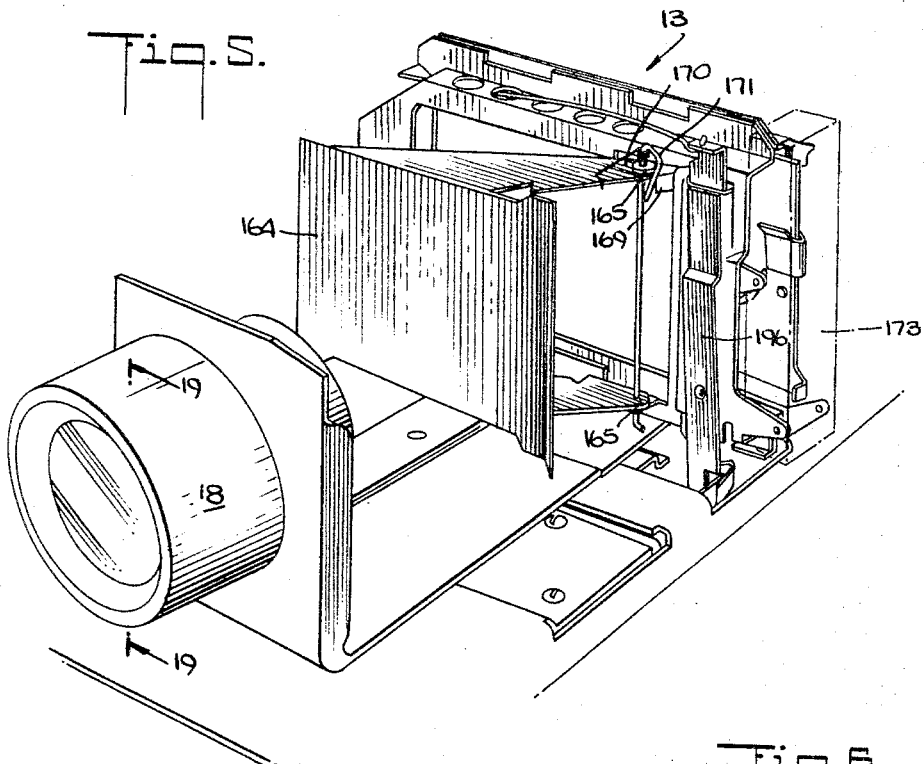
FIGS. 5–10 are perspective views of the shutter housing details.
Figure 9:
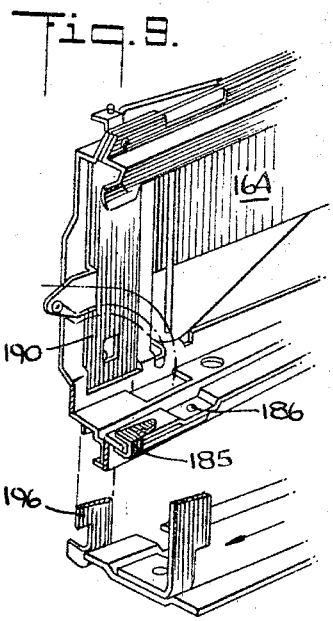
Figure 10:
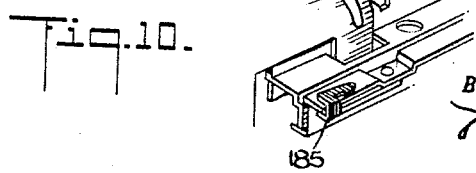

It is also desirable to limit the use of the slide editor 172 so that its cover cannot be opened except when a slide frame 10 is in position in the shutter housing 13. This prevents the accidental insertion of additional slides or slide frames into the projector which would interfere with the normal magazine operation. This is accomplished in the preferred embodiment of the projector by providing a latching spring 196 (FIG. 5) on the housing 13 which locks the editor cover 173 in its closed position as long as the sliding lever 12 is not in its fully inserted position. The cover 173 is locked in its closed position by a locking stud 197 attached to the latching spring 196 and adapted to engage an aperture 198 in the above described interlock bar 190. In order to open the editor cover 173 it is necessary for the interlock bar 190 to move downwardly under the control of the cam slot 192 as the editor cover is swung open as described above. The stud 197 which engages the aperture 198 in the interlock bar 190 prevents this movement except when the sliding lever 12 is in its fully inserted position as illustrated in FIG. 9 so that it engages the lower end of the locking spring and swings the spring and the stud clear of the interlock bar.

Thus, the interlock bar operates as described above to prevent the opening of the slide editor cover except when a slide is in position in the shutter housing 13 and thereafter prevents the subsequent operation of the slide changing mechanism until the editor plate 174 has been reinserted to its normal operating position and the editor cover 173 closed.

Control panel

In the preferred embodiment of the projector as illustrated in FIG. 2, the projector controls for local operation are assembled on a single conveniently positioned control panel 200. This panel extends along one edge of the projector 1 so that it is conveniently positioned adjacent to the slide magazine 9 and the slide injection lever 7. All the necessary projector controls are positioned on the panel 200. Thus, a projector elevation wheel 201 is mounted at the forward end of the control panel 200. As illustrated in FIG. 18, the elevation wheel 201 is coupled to a slideably mounted front support leg 202 through the intermediation of pinion shaft 203 and rack 204 on the leg 202. The above described focusing wheel 127 is mounted behind the elevation wheel 201 and an on-off switch 205 for lamp 14 is mounted behind focusing wheel 127.

The slide changing button 29 as well as an interval control button 206 for an automatic timing system as shown in my Patent No. 2,915,840 are also mounted on the control panel 200. At the rear end of control panel 200, a leveling adjustment knob 207 is provided as also illustrated in detail in FIG. 39. Button 207 is threadedly connected to adjustable rear foot 208 to raise or lower it to adjust the level of the projector.

The control cord for the above described remote control handle 84 which provides for both remote slide changing and for remote focusing is detachably connected to the projector base 2 by plug 209 (FIG. 3).

It will be seen that a novel, compact projector has been provided with means for providing both local and remote operation and for including both forward and reverse magazine operation from the remote location together with a focus control where it may be necessary to refocus the projector after a slide is changed. These features have been provided in a compact and reliable projector which includes a unique electro-mechanical operation system with numerous interlocks and safety features which prevent misuse of any of the controls and which prevent unintentional damage to the projector, to the individual slides, or to the magazine. The projector also incorporates a novel slide editing feature which permits changing or editing of the magazine while the magazine is in its regular viewing position on the projector. The slide editor also permits the projector to be used to project individual slides without the use of a magazine when desired.

The above features have also been incorporated in the present projector in such a way that a simplified and fool proof control system is provided which centralizes the operating controls on a single convenient operating panel so that all projector functions are under the constant observation and control of the operator.

As various changes may be made in the form, construction and arrangement of the parts herein without departing from the spirit and scope of the invention and without sacrificing any of its advantages, it is to be understood that all matter herein is to be interpreted as illustrative and not in a limting sense.

Having thus described my invention, I claim:

1. A slide changing device comprising the combination a base, a slide frame positioner located on said base, magazine guide means on said base for slidably supporting a slide magazine, a slide lever reciprocably mounted on said base and having a slide injection lever mounted on one end, said slide lever including means for attaching the lever to slide frames in a magazine supported by said guide means for moving the slide frames along a first path to and from the slide frame positioner, a pusher arm mounted on the opposite end of said slide lever adapted for movement therewith to engage slide frames for assuring their return along said first path to the magazine, said slide frame positioner comprising a slide frame support, a track for slidably supporting said slide frame support and adapted for being extended outwardly of the base in line with said first path and beyond said pusher bar and away from the magazine guide means for providing for sliding movement of said slide frame support in the direction of the first path away from the viewing position and the magazine, means for moving the pusher bar away from said track for permitting movement of the slide frame support on said track, and means at the slide frame positioner for detaching the slide injection lever from the slide frame upon movement of the slide frame support along said track.

2. The slide changing device as claimed in claim 1 which further comprises a shutter movably mounted adjacent to said slide frame positioner, shutter activating means on said slide frame support having a slide frame engaging member for swinging said shutter to an open position upon the entrance of a slide frame onto said slide frame support along said first path by said slide lever, and said activating means being positioned for reclosing said shutter when said slide frame support containing said slide frame is thereafter moved outwardly of the projector along said track.

3. The slide changing device as claimed in claim 1 which further comprises an inter-lock positioned for engaging said track for preventing extension of said track when the slide injection lever is withdrawn from the slide frame positioner to be engaged by the slide injection lever when it has been moved inwardly to position a slide frame in said slide frame positioner to thereby release said track permitting its extension outwardly of the slide changing device base.

4. The slide changing device as claimed in claim 3 in which said inter-lock further comprises means for preventing movement of the slide injection lever when the track is in its extended position.

References Cited by the Examiner
UNITED STATES PATENTS

| | | | |
|---|---|---|---|
| 2,008,020 | 7/1935 | Jackman | 88—24 |
| 2,614,458 | 10/1952 | Critoph et al. | 88—26 |
| 2,874,497 | 2/1959 | Huff et al. | 88—28 X |
| 2,915,840 | 12/1959 | Wilklund | 40—79 |
| 2,927,504 | 3/1960 | Smith | 88—26 |
| 2,979,987 | 4/1961 | Brumley et al. | 88—28 |
| 3,014,297 | 12/1961 | Robinson | 40—79 |
| 3,067,650 | 12/1962 | Pester | 40—79 X |

EUGENE R. CAPOZIO, *Primary Examiner.*

E. S. ANDERSON, G. Y. CUSTER, JEROME SCHNALL, *Examiners.*